Dec. 8, 1931.  V. E. FLODIN  1,835,292
GRINDING FIXTURE FOR VALVE BODY SEAT RINGS
Filed April 9, 1928
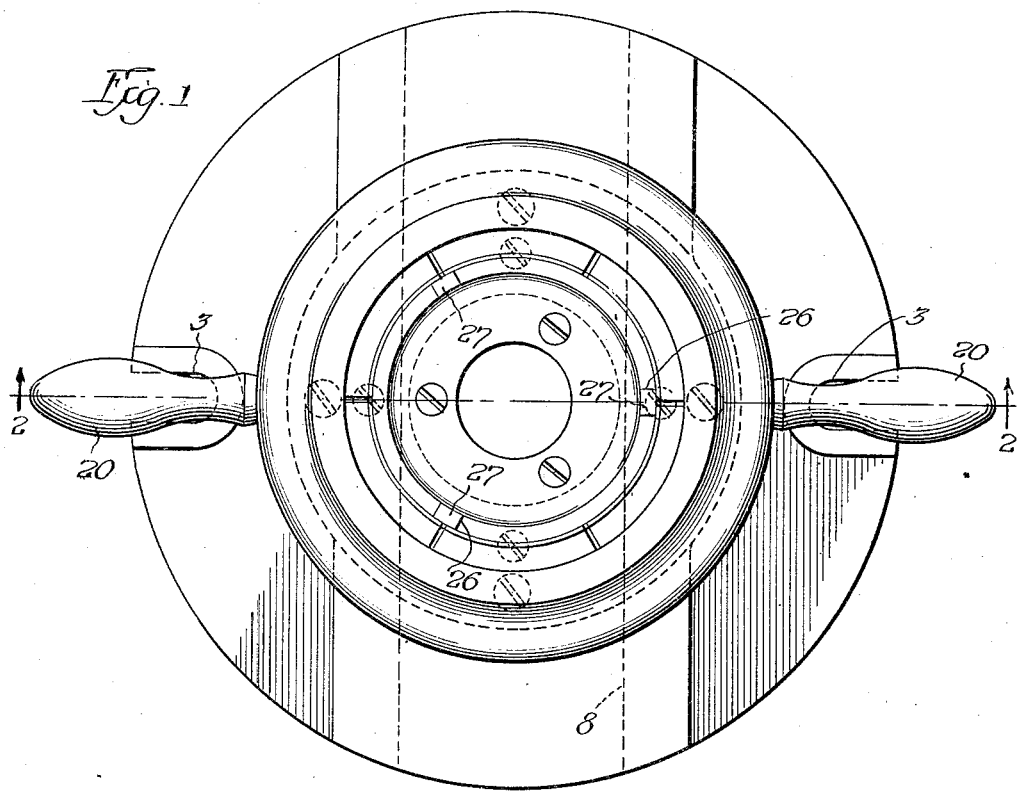
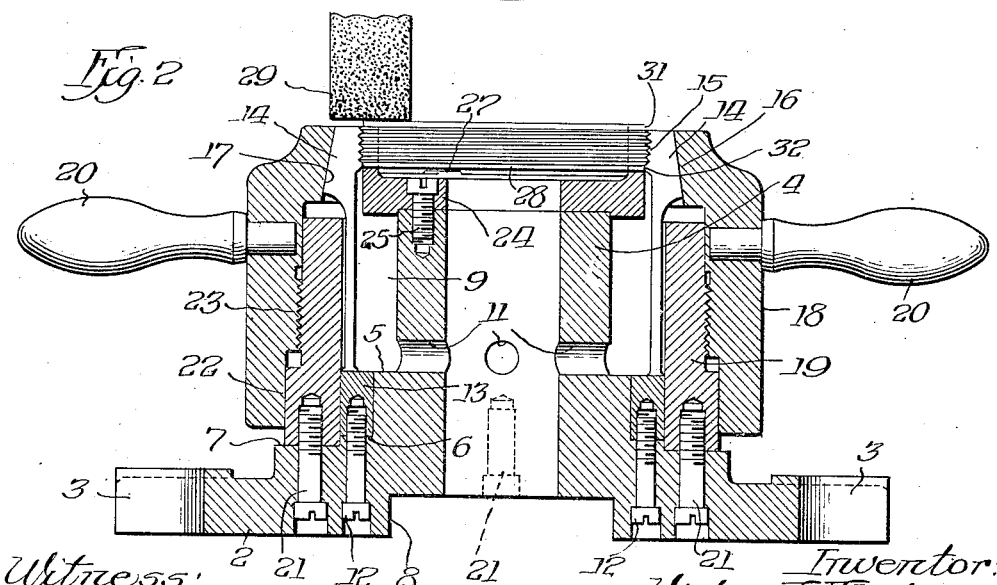

Patented Dec. 8, 1931

1,835,292

UNITED STATES PATENT OFFICE

VICTOR E. FLODIN, OF OAK PARK, ILLINOIS, ASSIGNOR TO CRANE CO., OF CHICAGO, ILLINOIS, A CORPORATION OF ILLINOIS

GRINDING FIXTURE FOR VALVE BODY SEAT RINGS

Application filed April 9, 1928. Serial No. 268,487.

This invention pertains to a device for finishing or rough cutting substantially opposed surfaces of an article. More particularly the invention disclosed herein is peculiarly useful in carrying out a method described in my copending application Serial No. 268,484, filed April 9, 1928, for the manufacture of an improved gate valve also described and claimed therein and to which reference may be had for one use of the present invention although many of its uses will be or should become apparent from the following.

Greatest difficulty has often been encountered in preparing certain articles, such for instance as valve seat rings, for their purpose and so that they will perform their functions properly in conjunction with other apparatus with which they may be associated. Taking a valve seat ring for example, it is particularly necessary, if such ring be of the type equipped with threads for screwing into the valve body, that the seat surface be so related, that is, positioned or located, with respect to the valve part that is to seat thereagainst, there will be perfect or true seating between the ring and such part. Further it is desirable that the same ring will operate or function properly in any one of a number of valve bodies without special fitting or adjusting in each case.

If the recess in the valve body into which the seat ring is to be screwed, or secured in some other manner, be formed with some seat ring positioning means which is located in predetermined definite relation to the operating parts of the valve or to the valve gate or closure member seat surface, it follows that the seat ring seating surface, if located in predetermined position or relation with respect to the ring positioning means in the body, will also be located in a predeterminable position with respect to the operating parts of the valve or to the valve gate or closure member, as the case may be.

Turning from the abstract to a concrete illustration, assume that a gate valve body has a vertically movable gate the planes of the seating surfaces of which intersect in a straight line lying in a plane bisecting the angle of intersection of their planes, in other words the gate is of the wedge type, and it is desired to provide removable seats in the body for cooperative engagement with the gate seat surfaces so positioned that the final closing movement of the gate will move the gate seat surfaces toward the seat surfaces of the removable seats in substantially parallel relation so that a true and circumferentially complete contact is made between them. Assume also that the amount of variation, if any, in the movement of the gate from its correct path of travel during closing movements, can be controlled or reduced to a negligible maximum.

If now circular recesses for seat rings be formed in the body about axes perpendicular to the plane of the corresponding gate seat surfaces at their centers when the gate is in its closed position, an abutment or positioning surface or surfaces, whether threads or a shoulder or some other device, be formed in each recess, a corresponding and cooperative abutment or positioning surface or surfaces be formed on the correlative body seat ring, and the body seat ring seat surface be cut or finished with respect to such corresponding and cooperative surface formed thereon, it results that the body seat ring seat surfaces may be made to receive and accurately and completely fit the seat surfaces of the wedge gate. Construction of gate valves with removable seats is much facilitated and cheapened by following such a method since, among other things, the seat rings, bodies and gates may be standardized and special fitting of gates and seats, gates and bodies, and bodies and seats avoided although extreme accuracy is obtained and maintained. Many other important advantages are secured as will more clearly appear by reference to the aforesaid copending application.

Preferably I prepare body seat rings for a purpose such as that above mentioned, from the cast, forged or otherwise initially formed rings, by threading them externally longitudinally of their axes with threads of the same pitch and diameter as similar threads formed in the body seat recesses by tapping the same. Thereafter or if desired before the threading, I cut away the metal peripherally at the junctures of the external side and end faces of each ring to provide an external circumferential portion at each end which will be devoid of threads. Preferably the depth of these cuts is no greater but equal to the depth of the threads.

After the rings have been completed thus far they are then ready to have one or both of their end faces finished, one face for engagement with the valve gate seat surface and one with a positioning surface or shoulder in the bottom of a body ring recess if desired or both faces finished for selective engagement with the gate seat surface and with the seat recess shoulder or the gate seat surface alone. It will, of course, be appreciated that the function of contact of one end of the body ring and the body recess shoulder may merely be that of determining the depth to which the ring may be seated in the recess, the ring and recess threads alone serving to define the angle of attack or presentation of the ring seat surface to the gate seat surface. This surface finishing is preferably carried out by the process and with the machine and apparatus disclosed in this application, and, bearing the foregoing in mind.

One of the primary objects of my invention is to provide a device whereby one or more surfaces transverse to the threaded lengths of the threaded article may be finished to lie in a plane or planes each at a predetermined angular relationship to the pitch or some other characteristic of the threads such as the beginning or ending of a thread or in a plane bearing a particular angular relationship to another surface likewise determined. The preferred device holds a threaded article by the threads with the thread or threads beginning and ending in predetermined or particular positions with respect to the tool adapted to operate over and finish the surface to be finished and permits moving the tool relatively to said surface to effect the surfacing.

Another important object is to provide a device which will hold successive like threaded articles of the above mentioned character with the threads of each in a predetermined position with respect to the plane or line of movement of the surfacing tool or, stated in a broader way, a machine, jig or fixture which will hold successive articles in the same predetermined relationship with respect to the plane of operation of a surfacing tool.

Many further objects including the details of construction and the arrangement of the parts, their function and operation will be or should become clearly apparent from the following description and claims and from the drawings in which:

Fig. 1 is a top plan view of a preferred construction for a jig embodying a part of my invention, and Fig. 2 is a vertical sectional view of the same taken on the line 2—2 of Fig. 1.

The device illustrated as embodying the preferred form of my invention has a base 2 adapted to be secured to a stationary or rotating support of any suitable construction by means of anchor bolts or the like (not shown) engaging with the support and with the base through diametrically opposite recesses or slots 3 formed in the latter. The base 2 is preferably circular and has a central tubular upstanding boss 4 between which and the horizontal portion of the base a plurality of circumferential upwardly facing shoulders 5, 6 and 7 are provided. The cylindrical boss 4 is cored out axially to intersect a slot 8 formed in the bottom of the base and extending from side to side thereof transversely of the line centers of the recesses or slots 3. The shoulder 5 provides with a portion of the mechanism to be described a circumferential space 9 into which refuse from the cutting or finishing operations in surfacing may be dropped and from which the refuse is carried or discharged to the cored center of the boss 4 by means of a plurality of transverse connecting orifices 11. From the bore of the boss 4 the refuse, of course, falls into the slot 8 and may be removed in any suitable manner.

Removably and replaceably mounted on the shoulder 6 by means of machine screws 12 is a collet ring 13 having integral spring jaws 14 the inner upper surface of each of which is provided with threads 15 corresponding to the threads formed on the article to be held and the outer upper surface of each of which is tapered as shown at 16 to conform to and parallel a similar tapered surface 17 formed on a collet closing and releasing member generally designated 18. A substantially cylindrical ring 19 concentrically surrounding the collet and boss 4 seats upon the shoulder 7 on the base and is removably secured thereto by machine screws 21. The lower portion of the external cylindrical surface of the ring 19, designated 22, forms a bearing and guiding surface for the lower portion of the internal cylindrical surface of the member 18 while both the member 18 and the ring 19 at portions immediately above and adjacent the bearing surfaces 22 are interengageably threaded as shown at 23 so that rotation of the member 18, by means of handles 20, relatively to the ring 19 will raise or lower the member 18 relatively to the member 19 and cause the tapered surface 17 to release or close the collet jaws respectively.

On top of the boss and centered with respect to the collet jaws and the tapered surfaces 16 and 17 a ring 24 is removably secured by means of machine screws 25. This ring 24 is provided with a plurality of upstanding bosses 26 the top of each of which forms a positioning surface 27 upon and against which one surface of an article to have its surfaces finished is abutted. In Fig. 2 I have illustrated an article, a valve body seat ring 28, mounted in the jig or machine ready to have one of its end surfaces ground off through the operation of a grinding wheel or tool 29 which in the embodiment illustrated is arranged to grind from its peripheral surface.

It will be noted from the drawings that the ring has been threaded externally at its central portion although threads have been omitted from the portions designated 31 and 32 adjacent its ends. When the rough ended ring is first placed in the jig or machine to have one of its ends ground the opposite end surface preferably should not contact with the surfaces 27 on the ring 24 but if the end surface then presented to be ground is to be ground in a plane perpendicular to the axis of the ring of the axis or line of threading, mere engagement of the threaded portion of the collet with the threads of the article will align the article or ring in proper position if the support for the base of the machine is then set in proper position with respect to the plane of travel of the grinding wheel or other tool. Operation of the tool will finish the first surface in a plane having a predetermined angular relationship with respect to the pitch of the threads or the axis of the ring.

Any refuse from the grinding or cutting operation which might tend to accumulate in or about the ring will drop down into the space between the collet and boss 4 or centrally down within the boss 4 and thus be carried out of the way. The positioning surfaces, of course, will be used to determine the depth of grinding or to aid in support of the article, as may be desired.

The foregoing description has not only included a description of the mechanical elements as such but also gives a description of their operation or function individually and collectively and for such reason it is not believed necessary again to recite their functions and mode of operation. It will be appreciated that the method of my invention has broader aspects, is susceptible of being carried out by other apparatus than that above described, and that the apparatus itself as illustrated and described is but one embodiment of my invention and even in itself is susceptible of wide modification and variation. Accordingly I do not wish to be limited to the specific illustrations above given but only by the spirit of the invention and the scope of the appended claims.

I claim:

1. In combination, a grinding machine having a grinding tool presenting a grinding face and means for securing an article with its opposite sides in predetermined relation to said grinding face comprising, a base member, an article support having an article positioning surface secured to said base member, a split collet about said support above said surface, and means for contracting said collet against the periphery of an article resting against said surface, said positioning surface being arranged in predetermined relation with respect to the contacting surfaces of said collet.

2. In combination, a grinding machine having a grinding tool presenting a grinding face and means for securing an article in predetermined relation to said grinding face comprising, a base member, an article support having an article positioning surface secured to said member, a split collet about said support above said surface and having thread engaging teeth formed thereon adapted to engage the threads of a threaded article positioned against said surface, said positioning surface being arranged in predetermined relation with respect to said teeth and means for contracting said collet to engage its teeth with the threads of such article.

3. In a device of the character described, a relatively stationary base having an upwardly projecting portion, a split collet surrounding said portion, said portion having a positioning surface for articles to be held by said collet, means for contracting said collet against an article positioned by said surface, and means on the engaging surfaces of said collet cooperative with the peripheral surface of an article to be held thereby for holding said article in predetermined relation with respect to said positioning surface.

4. In a machine for finishing opposite faces of an article to predetermined size, a base member, an article support having an article positioning surface secured to said base member for supporting said article with two opposed faces thereof in predetermined perpendicular relation to said support, a split collet about said support and extending above said surface, and means for contracting said collet against an article resting against said surface, the contacting surfaces of said collet having means thereon for cooperation with the peripheral surface of the article being held to retain the article in predetermined relation to said positioning surface.

In witness of the foregoing I affix my signature.

VICTOR E. FLODIN.